United States Patent
Mori et al.

(10) Patent No.: US 8,588,684 B2
(45) Date of Patent: Nov. 19, 2013

(54) COMMUNICATION APPARATUS FOR PERFORMING DATA COMMUNICATION ELECTRODE UNIT AND A LIVING BODY

(75) Inventors: Koichi Mori, Kanagawa-ken (JP); Takafumi Ohishi, Kanagawa-ken (JP); Kazuhiro Inoue, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 39 days.

(21) Appl. No.: 13/418,450

(22) Filed: Mar. 13, 2012

(65) Prior Publication Data

US 2013/0149961 A1  Jun. 13, 2013

(30) Foreign Application Priority Data

Dec. 7, 2011  (JP) ................................ 2011-267571

(51) Int. Cl.
*H04B 5/00* (2006.01)
(52) U.S. Cl.
USPC ........................ 455/41.1; 455/41.2; 455/269
(58) Field of Classification Search
USPC ...................................................... 455/41.1
See application file for complete search history.

(56) References Cited

U.S. PATENT DOCUMENTS

2010/0304671 A1* 12/2010 Hebiguchi et al. ........... 455/41.1
2012/0129449 A1* 5/2012 Kurata et al. ................ 455/41.1

FOREIGN PATENT DOCUMENTS

JP  2003-37566  2/2003

* cited by examiner

*Primary Examiner* — Fayyaz Alam
*Assistant Examiner* — David Bilodeau
(74) *Attorney, Agent, or Firm* — Oblon, Spivak, McClelland, Maier & Neustadt, L.L.P.

(57) ABSTRACT

According to one embodiment, the signal electrode is disposed on the first principal surface side of the substrate and is connected to the other end of the second signal line. The housing covers and accommodates therein the substrate, the communication unit, the first signal line, the terminal, the second signal line, and the signal electrode. The conductive material is arranged on an outer side of the housing so as to be opposite to the signal electrode, and includes an outer peripheral portion extended outward beyond an outer periphery of the signal electrode. The communication apparatus carries out data communication via a living body.

18 Claims, 16 Drawing Sheets

COMMUNICATION APPARATUS FOR PERFORMING DATA COMMUNICATION ELECTRODE UNIT AND A LIVING BODY

CROSS REFERENCE TO RELATED APPLICATION

This application is based upon and claims the benefit of priority from the prior Japanese Patent Application No. 2011-267571, filed on Dec. 7, 2011, the entire contents of which are incorporated herein by reference.

FIELD

The embodiments described herein are related to a communication apparatus.

BACKGROUND

Body area network technology to transmit and receive communication data via a living body such as a human body is developed in various fields. In the body area network, a communication apparatus utilizing the human body as part of a transmission line is provided with two electrodes. One of the electrodes is a signal electrode connected to a signal line, while the other of the electrodes is a reference potential electrode having a reference potential and being connected to a ground potential of the communication apparatus. The communication apparatus transmits a potential difference between the signal electrode and the reference potential electrode to another communication apparatus with their signal electrodes coupled together mainly via a human body and the reference potential electrodes coupled together mainly via space or earth.

The signal electrode is disposed inside a housing, taking into account entry of water, surface deterioration, wear, and the like. In this case, capacitive coupling between the human body and the signal electrode is via the housing, thus leading to varying distances from the human body surface. Therefore, there is a problem of causing a decrease in electric field components perpendicular to the human body surface and hence a deterioration in transmitting/receiving performance. Also, there arises a problem that the housing decreases in strength because of coming in direct contact with the human body.

DETAILED DESCRIPTION

Figure 1:
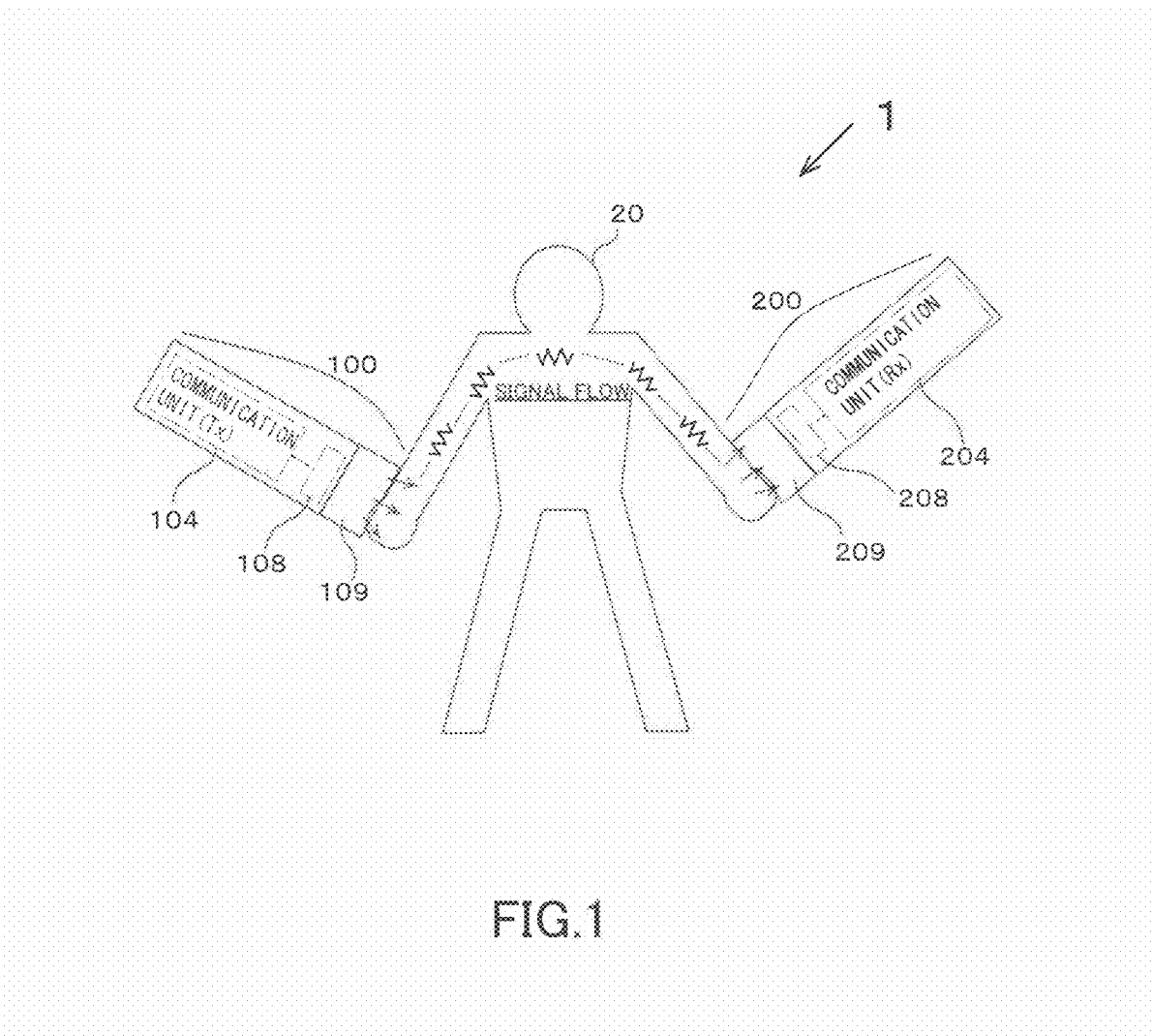
FIG. 1 is a view showing a configuration of a communication system according to a first embodiment.

According to one embodiment, a communication apparatus is provided with a substrate, a communication unit, a first signal line, a terminal, a second signal line, a signal electrode, a housing, and a conductive material. The substrate is provided with a reference potential electrode. The communication unit is disposed on a first principal surface of the substrate. The first signal line is disposed on the first principal surface of the substrate and is connected at one end to the communication unit. The terminal is disposed on the first principal surface of the substrate and is connected at one end to the other end of the first signal line. The second signal line is disposed on the first principal surface side of the substrate and is connected at one end to the other end of the terminal and via the terminal to the first signal line. The signal electrode is disposed on the first principal surface side of the substrate and is connected to the other end of the second signal line. The housing covers and accommodates therein the substrate, the communication unit, the first signal line, the terminal, the second signal line, and the signal electrode. The conductive material is arranged on an outer side of the housing so as to be opposite to the signal electrode, and includes an outer peripheral portion extended outward beyond an outer periphery of the signal electrode. The communication apparatus carries out data communication via a living body.

Further plural embodiments will be described below with reference to the drawings. In the drawings, the same reference numerals indicate the same or similar portions.

Figure 2:
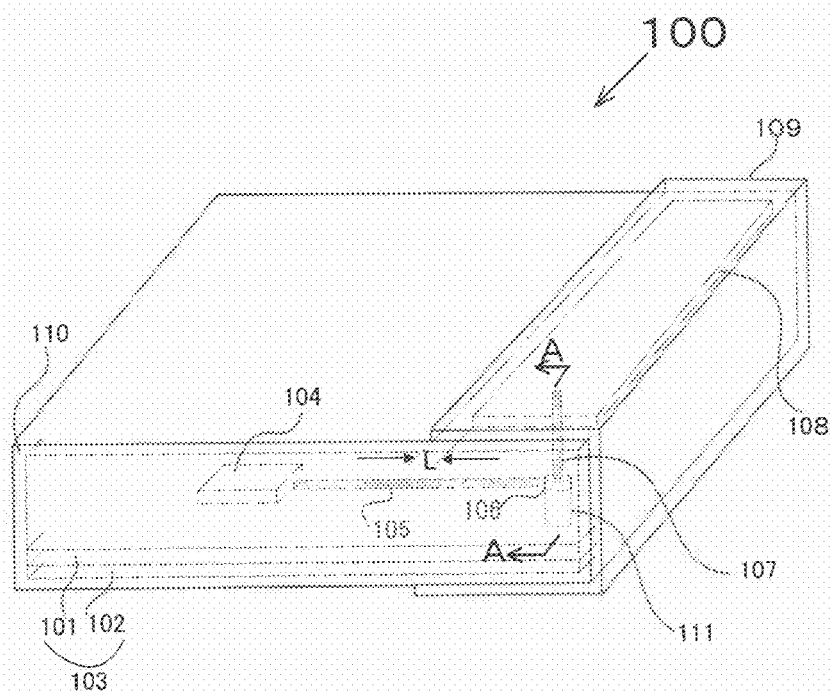
FIG. 2 is a view showing a configuration of a communication apparatus according to the first embodiment.
Figure 3:
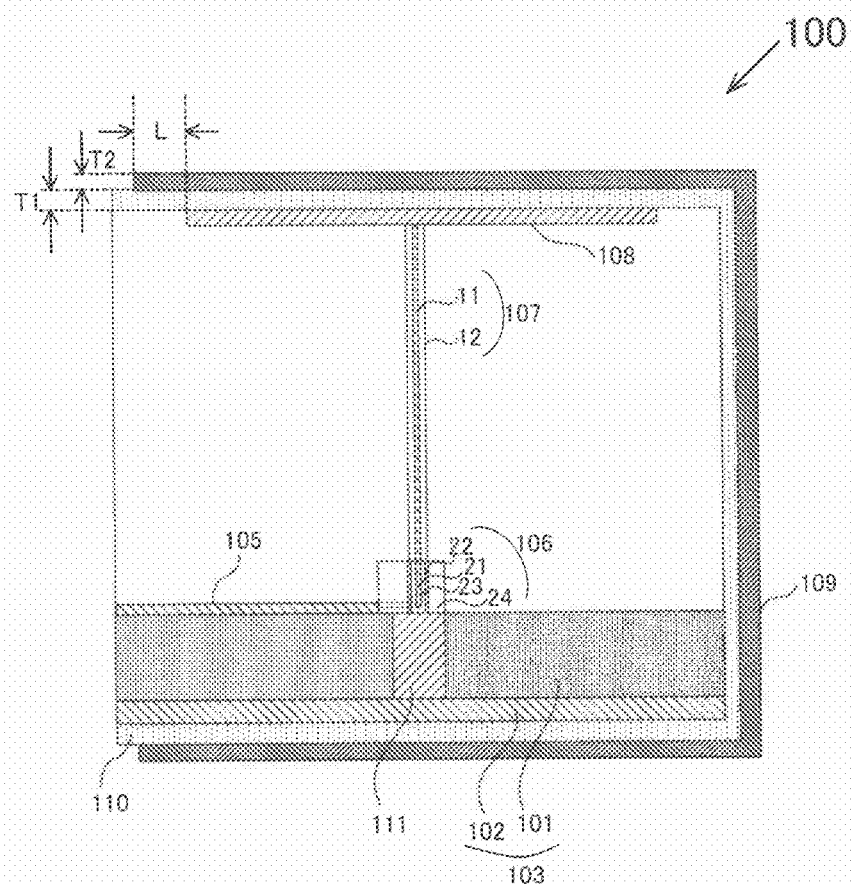
FIG. 3 is a cross-sectional view of the communication apparatus taken along line A-A of FIG. 2.

A communication apparatus according to a first embodiment will be described with reference to the drawings. FIG. 1 is a view showing a configuration of a communication system. FIG. 2 is a view showing a configuration of the communication apparatus. FIG. 3 is a cross-sectional view taken along line A-A of FIG. 2. In the embodiment, a conductive material is arranged on an outer side of a housing so as to be opposite to a signal electrode disposed on an inner side of the housing, thereby to improve transmitting/receiving performance.

As shown in FIG. 1, a communication system 1 is provided with a communication apparatus 100 and a communication apparatus 200. The communication system 1 uses electric field method to provide wearable computing communication between the communication apparatus 100 and the communication apparatus 200 via a living body 20 such as a human body.

In the communication system 1, when a communication unit 104 of the communication apparatus 100, for example, acts as a transmitter (Tx), data transmitted from the communication unit 104 is transmitted via a signal electrode 108, a conductive material 109, the living body 20, a conductive material 209, and a signal electrode 208 to a communication unit 204 of the communication apparatus 200, and the communication unit 204 acts as a receiver (Rx). Meanwhile, when the communication unit 204 of the communication apparatus 200 acts as the transmitter (Tx), the communication unit 104 of the communication apparatus 100 acts as the receiver (Rx).

Here, during data communication, the conductive material 109 and the conductive material 209 are for example in a state in which they are in contact with hands of the living body 20 or the hands are placed over them. The electric field method involves causing a change in an electric field along the surface of the living body 20 such as the human body, thereby effecting communication of information to be sent. At this time, the living body 20 such as the human body places the hands over the electrodes or does the like without touching the electrodes thereby to execute data communication between the electrodes and the living body such as the human body. A communication frequency (sometimes called a carrier frequency) for the data communication lies between a few hundreds of kHz and a few tens of MHz, for example.

Incidentally, although in FIG. 1 the human body (a human being) is considered as the living body 20, the embodiment is not necessarily so limited. An animal such as a dog or a cat may replace the human body.

As shown in FIG. 2, the communication apparatus 100 is provided with a substrate 103, a communication unit 104, a signal line 105, a terminal 106, a signal line 107, a signal electrode 108, a conductive material 109, a housing 110, and a via 111. In the communication apparatus 100, capacitive coupling occurs between the living body 20 and the conductive material 109 and between the conductive material 109 and the signal electrode 108 to, consequently, produce an electric field on the surface of the living body 20 and thereby effect data communication. Incidentally, in the communication apparatus 200, capacitive coupling occurs between the living body 20 and the conductive material 209 and between the conductive material 209 and the signal electrode 208, and thus, the signal electrode 208 receives the electric field produced on the human body surface, via the conductive material 209.

The substrate 103 includes a dielectric portion 101 and a reference potential electrode 102. The reference potential electrode 102 is sometimes called a ground electrode. The dielectric portion 101 is disposed on a first principal surface (a top surface) of the reference potential electrode 102. The dielectric portion 101 is constructed of insulating ceramics or insulating organic matter, for example, or the like. The reference potential electrode 102 is constructed of a metal layer such as copper (Cu) or gold (Au), for example.

The communication unit 104 is disposed on a first principal surface (a top surface) of the dielectric portion 101, and serves to transmit and receive data. The signal line 105 is disposed on the first principal surface (the top surface) of the dielectric portion 101 and is connected at one end to the communication unit 104. The terminal 106 is disposed on the first principal surface (the top surface) of the dielectric portion 101 and is connected to the other end of the signal line 105. A ground portion of the communication unit 104, although not shown, is connected through the via to the reference potential electrode 102.

The signal line 107 is disposed on the first principal surface (the top surface) side of the dielectric portion 101 (specifically, on the terminal 106) and is connected at one end to the terminal 106. The signal electrode 108 connected to the other end of the signal line 107 is disposed on the signal line 107. The signal electrode 108 has a quadrangular shape (as seen from right above in FIG. 2). Here, the signal line 107 is arranged in a direction perpendicular to the substrate 103. Incidentally, the terminal 106 is connected through the via 111 to the reference potential electrode 102 (details of which will be described later).

The housing 110 has the shape of a quadratic prism in which a horizontal dimension is larger than a height dimension. The housing 110 covers and accommodates therein the communication unit 104, the signal line 105, the terminal 106, the signal line 107, and the signal electrode 108.

The conductive material 109 is arranged on three faces (i.e. a top surface, a right side surface and a bottom surface in FIG. 2) on an outer side of the housing 110. The conductive material 109 disposed on the top surface on the outer side of the housing 110 is arranged so as to be opposite to the signal electrode 108 arranged on an inner side of the housing 110, and is arranged on the outer side of the housing 110 so as to have an outer peripheral portion extended outward by a length L beyond an outer periphery of the signal electrode 108.

Here, an electrically-conductive metal sheet such as a copper foil, an electrically-conductive ink formed into a thin film and sintered by using coating or ink-jet method, or a transparent electrode film such as ITO (indium tin oxide), for example, or the like is used for the conductive material 109. Use of the electrically-conductive ink facilitates forming the conductive material 109 on the outer side of the housing 110 regardless of the shape of the housing 110. Use of the transparent electrode film enables recognition of what is displayed, even if the transparent electrode film is placed overlaying a display or a console.

Arrangement of the conductive material 109 on the outer side of the housing 110 enables improving the transmitting/receiving performance of the communication apparatus 100 (details of which will be described later), and also enables improving waterproofness of the communication apparatus 100 and strength of the housing 110.

As shown in FIG. 3, the signal line 105 is formed on the dielectric portion 101 by etching or the like.

The terminal 106 includes an inner conductive portion 21, an outer conductive portion 22, a dielectric layer 23, and a dielectric layer 24. The inner conductive portion 21 is disposed in a central portion of the terminal 106, and the dielectric layer 23 is disposed around the periphery of the inner conductive portion 21. The outer conductive portion 22 is disposed around the inner conductive portion 21 with the dielectric layer 23 in between. The dielectric layer 24 is disposed around the periphery of the outer conductive portion 22.

The signal line 107 includes an inner signal line 11 and a dielectric layer 12. The inner signal line 11 is disposed in a central portion of the signal line 107, and the dielectric layer 12 is disposed around the periphery of the inner signal line 11.

The signal line 105 is connected at one end to the communication unit 104 and at the other end to one end of the inner conductive portion 21 of the terminal 106.

The inner conductive portion 21 of the terminal 106 is connected at the other end to one end of the inner signal line 11 of the signal line 107. The outer conductive portion 22 of the terminal 106 is connected at one end through the via 111 to the reference potential electrode 102.

The inner signal line 11 of the signal line 107 is connected at the other end to the signal electrode 108. The signal electrode 108 is disposed on an inner wall of the housing 110 having a thickness T1. The conductive material 109 has a thickness T2, and is arranged on the three faces (i.e. the top surface, the right side surface and the bottom surface) on the outer side of the housing 110. The conductive material 109 is electrically insulated from the reference potential electrode 102 by the housing 110, and the conductive material 109 is in a floating state when the living body 20 is not in contact with the conductive material 109.

Figure 4:
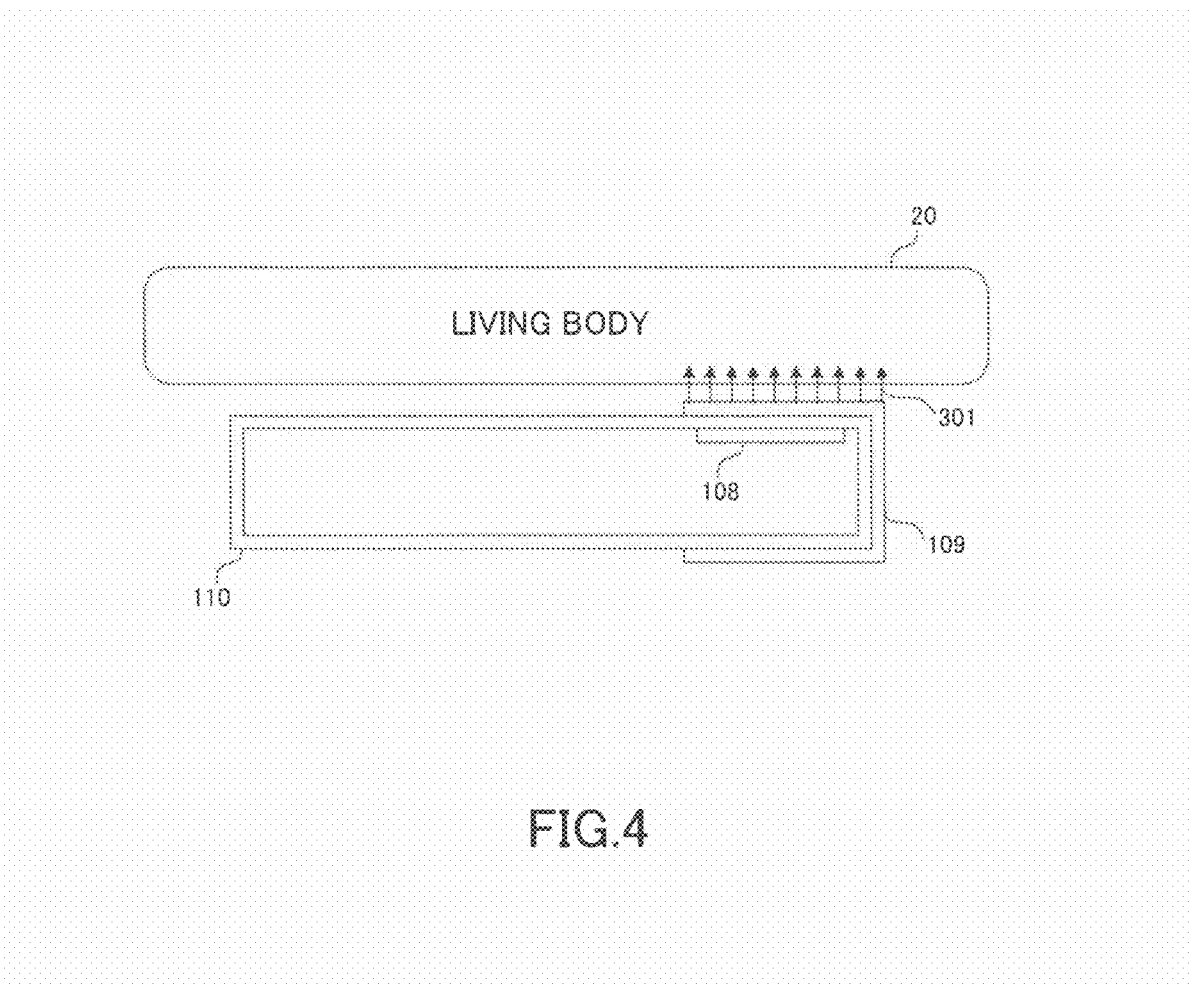
FIG. 4 is a view showing an electric field generated by the communication apparatus according to the first embodiment.
Figure 5:
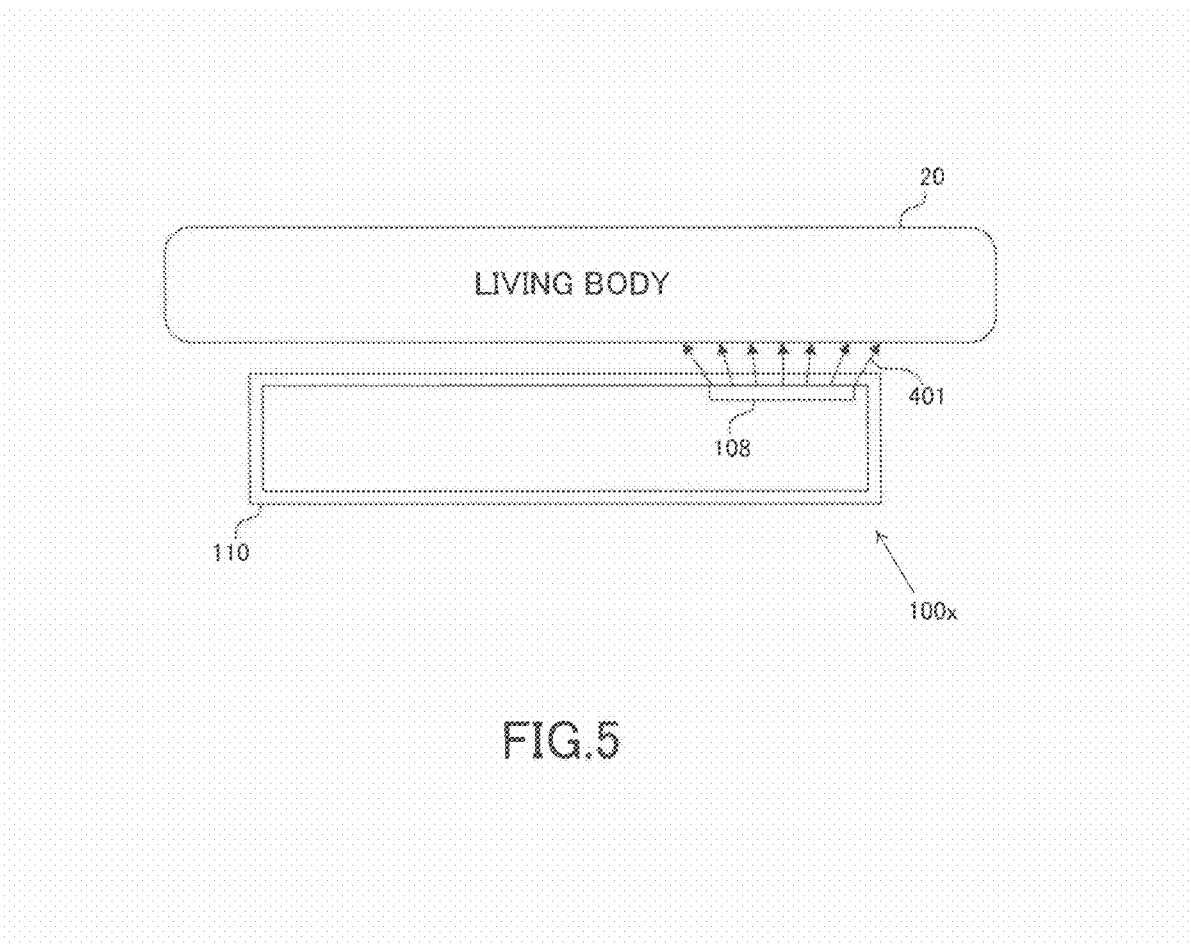
FIG. 5 is a view showing an electric field generated by a communication apparatus of a comparative example according to the first embodiment.

Next, description will be given with reference to FIGS. 4 and 5 with regard to advantageous effects of the conductive material disposed on the outer side of the housing. FIG. 4 is a view showing an electric field generated by the communication apparatus. FIG. 5 is a view showing an electric field generated by a communication apparatus of a comparative example.

As shown in FIG. 4, in the communication system 1, when a signal outputted by the communication unit 104 of the communication apparatus 100 is transmitted to the signal electrode 108, a potential in accordance with signal level is produced in the signal electrode 108. The signal electrode 108 is arranged so as to be opposite to the conductive material 109 with the housing 110 in between, and thus, a potential comparable to that in the signal electrode 108 is produced also in the conductive material 109 by capacitive coupling. When a state arises where the hand of the living body 20 is in contact with the conductive material 109 or is placed over the conductive material 109, capacitive coupling occurs between the conductive material 109 and the surface of the living body 20. Thus, an electric field 301 perpendicular to the surface of the living body 20, such as is shown by arrows of FIG. 4, is produced.

Intensity of the electric field varies in accordance with the level of the signal outputted by the communication unit 104, and thus, radio waves are produced. Electric field components of the radio waves are perpendicular to the surface of the living body 20, and propagate toward the communication apparatus 200 along the surface of the living body 20 as a boundary surface. The communication apparatus 200 side as the receiving end is configured to form capacitive coupling between the conductive material 209 and the living body 20 and to have high receiver sensitivity to the electric field components perpendicular to the surface of the living body 20 and thus enable receiving the radio waves propagating along the surface of the living body 20 to the communication apparatus 200 with high sensitivity. Thus, the communication system 1 can achieve an improvement in the transmitting/receiving performance.

Meanwhile, as shown in FIG. 5, in a communication apparatus 100x of the comparative example not provided with the conductive material 109, the signal electrode 108 arranged on the inner side of the housing 110 is capacitively coupled to the surface of the living body 20 with the housing 110 in between, which in turn causes a decrease in an electric field having components perpendicular to the surface of the living body 20 and thus produces an electric field 401 diverging outwardly, as shown by arrows of FIG. 5. This leads to a decrease in radio waves propagating along the surface of the living body 20 and hence to a decrease in the receiver sensitivity. Therefore, a communication system of the comparative example involves a deterioration in the transmitting/receiving performance.

Figure 6:
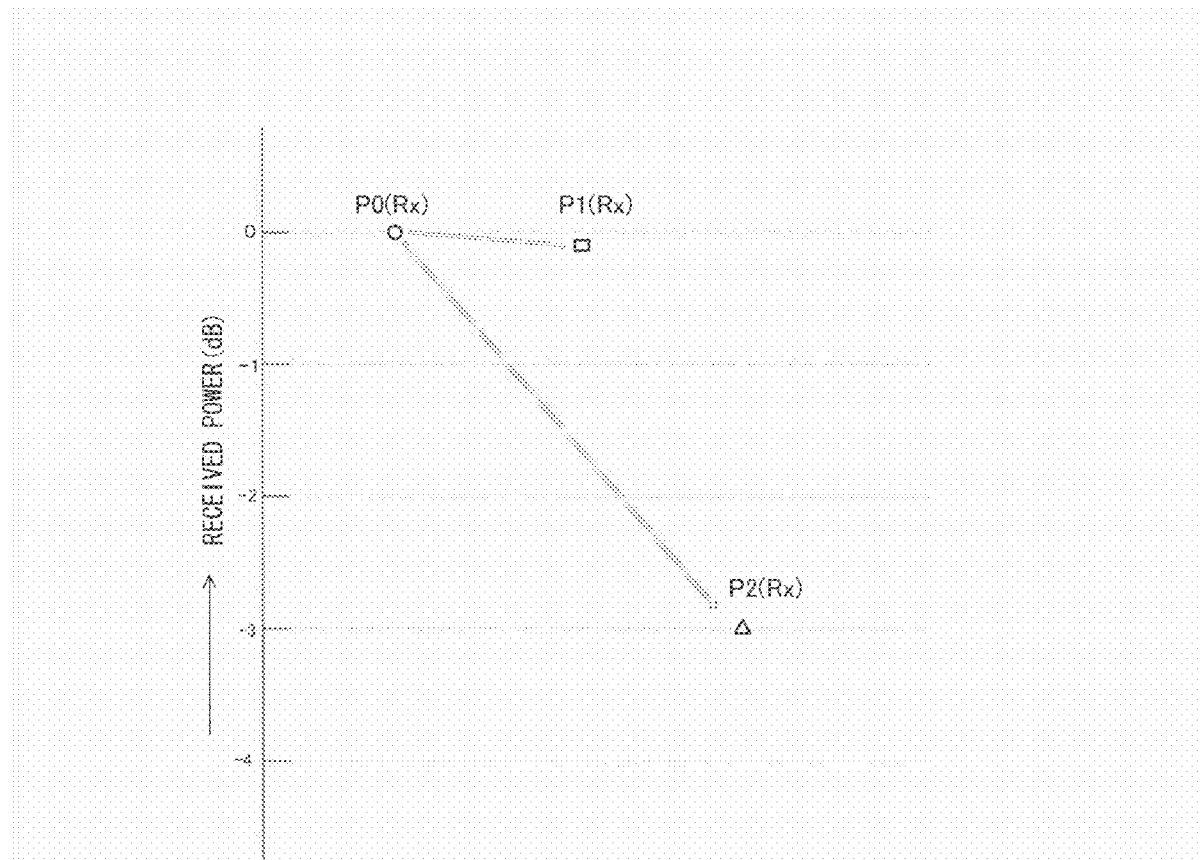
FIG. 6 is a graph showing received power in the communication apparatus according to the first embodiment.
Figure 7:
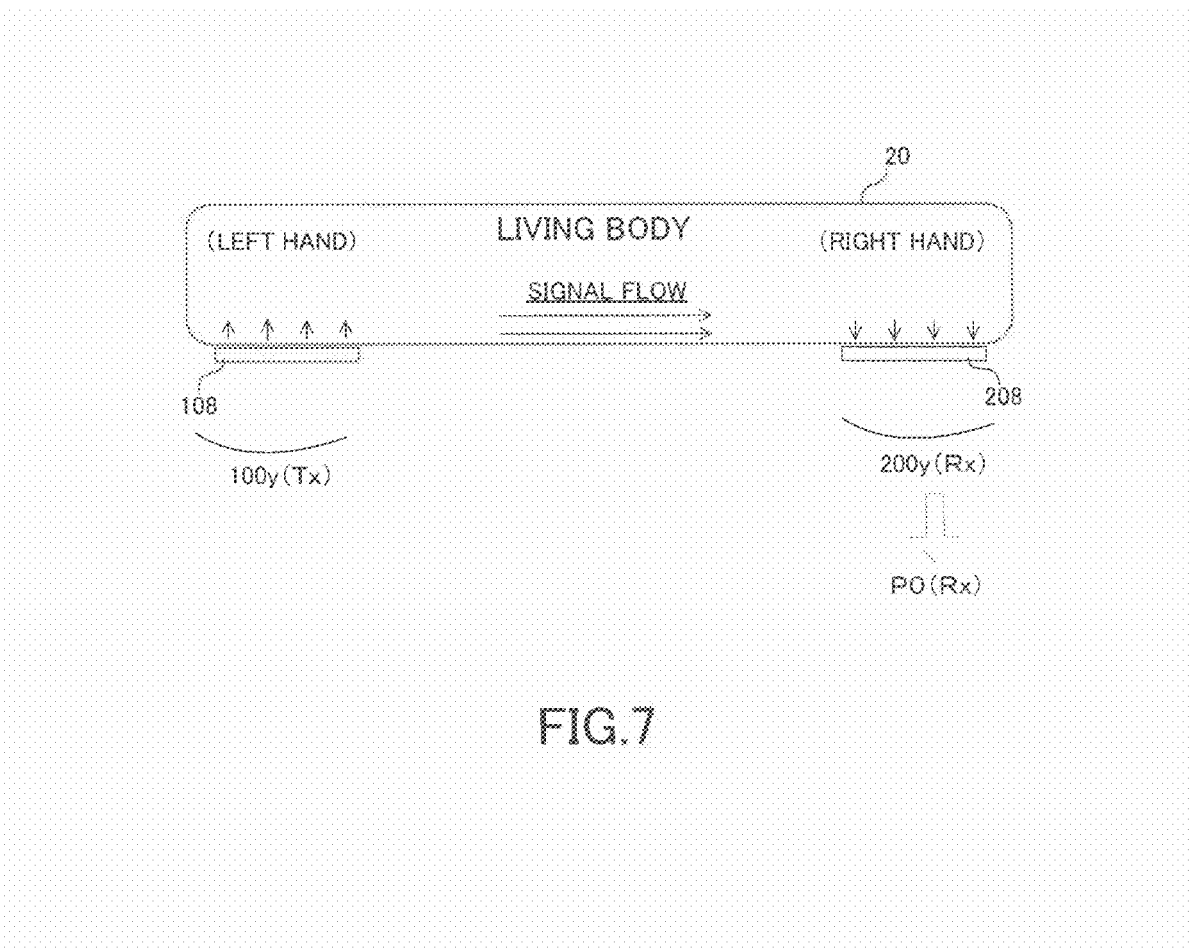
FIG. 7 is a view showing a signal flow when a signal electrode according to the first embodiment is in contact with a living body.
Figure 8:
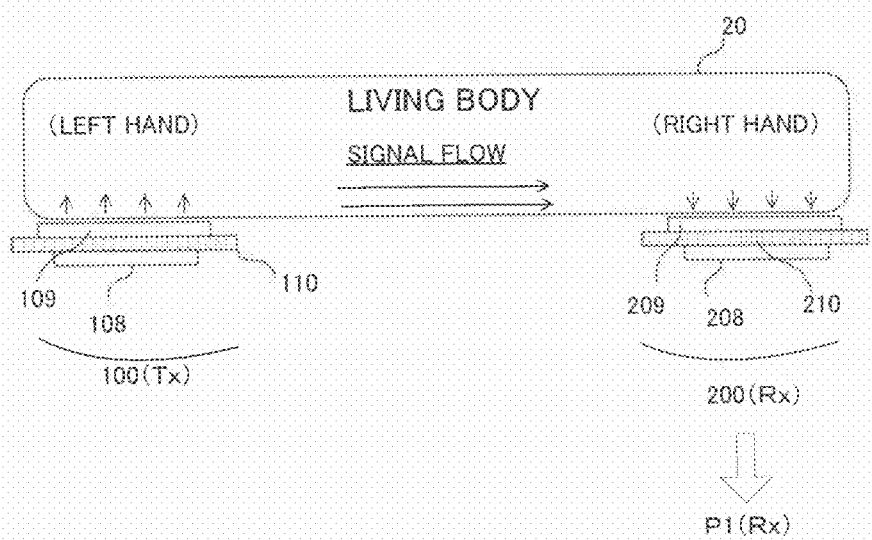
FIG. 8 is a view showing a signal flow when a conductive material of the communication apparatus according to the first embodiment is in contact with the living body.
Figure 9:
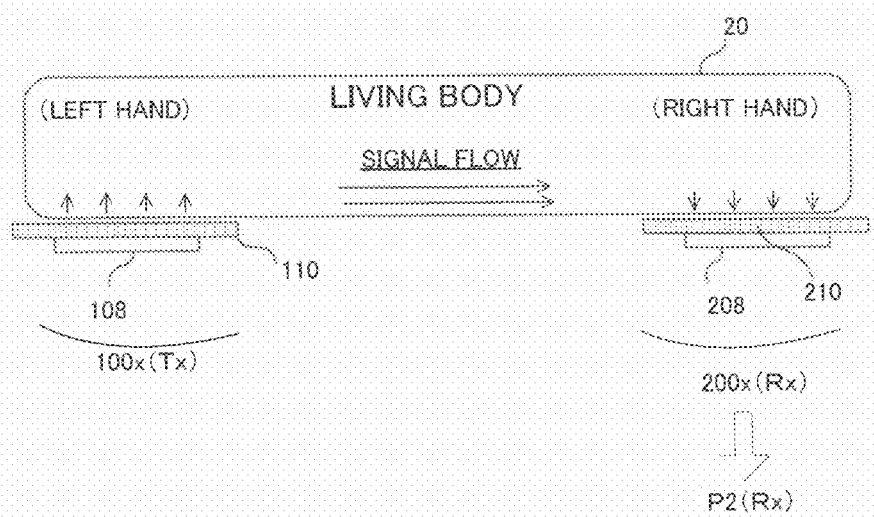
FIG. 9 is a view showing a signal flow when a housing of a communication apparatus of a comparative example according to the first embodiment is in contact with the living body.

Next, description will be given with reference to FIGS. 6 to 9 with regard to received power in the communication apparatus. FIG. 6 is a graph showing the received power in the communication apparatus. FIG. 7 is a view showing a signal flow when the signal electrode is in contact with the living body. FIG. 8 is a view showing a signal flow when the conductive material of the communication apparatus is in contact with the living body. FIG. 9 is a view showing a signal flow when the housing of the communication apparatus of the comparative example is in contact with the living body.

FIG. 6 provides a comparison of received power P0 (Rx), received power P1 (Rx), and received power P2 (Rx). Here, the received power P1 (Rx) and the received power P2 (Rx) are represented as the amounts of changes relative to the received power P0 (Rx), using the received power P0 (Rx) as a reference value (0 dB).

As shown in FIG. 7, the received power P0 (Rx) is the received power in the communication system when the signal electrode 108 of a communication apparatus 100y comes in direct contact with the left hand of the living body 20 and the signal electrode 208 of a communication apparatus 200y comes in direct contact with the right hand of the living body 20 thereby to effect data communication from the communication apparatus 100y side via the living body 20 to the communication apparatus 200y side.

As shown in FIG. 8, the received power P1 (Rx) is the received power in the communication system 1 when the conductive material 109 of the communication apparatus 100 of the embodiment comes in contact with the left hand of the living body 20 and the conductive material 209 of the communication apparatus 200 of the embodiment comes in contact with the right hand of the living body 20 thereby to effect data communication from the communication apparatus 100 side via the living body 20 to the communication apparatus 200 side.

As shown in FIG. 9, the received power P2 (Rx) is the received power in the communication system of the comparative example when the housing 110 of the communication apparatus 100x of the comparative example comes in contact with the left hand of the living body 20 and a housing 210 of a communication apparatus 200x of the comparative example comes in contact with the right hand of the living body 20 thereby to effect data communication from the communication apparatus 100x side via the living body 20 to the communication apparatus 200x side.

As shown in FIG. 6, in the communication system of the comparative example, the hands of the living body 20 are in direct contact with the outer sides of the housings, which in turn leads to a decrease in an electric field having components perpendicular to the surface of the living body 20 and hence to formation of the electric field 401 diverging outwardly (shown in FIG. 5). Thus, the received power P2 (Rx) undergoes a significant 3-dB deterioration relative to the received power P0 (Rx) when the signal electrode 108 is in direct contact with the left hand of the living body 20 and the signal electrode 208 is in direct contact with the right hand of the living body 20.

Meanwhile, in the communication system 1 of the embodiment, the conductive material 109 is disposed on the outer side of the housing 110 of the communication apparatus 100, and the conductive material 209 is disposed on the outer side of the housing 210 of the communication apparatus 200. Thus, the electric field 301 perpendicular to the surface of the living body 20 is produced (shown in FIG. 4), and there is a decrease of only 0.1 dB in the received power P1 (Rx) relative to the received power P0 (Rx). Therefore, the received power P1 (Rx) can be maintained at substantially the same level as the received power P0 (Rx) to thus enable a significant improvement in the receiver sensitivity.

As described above, according to the communication apparatus of the embodiment, the communication apparatus 100 and the communication apparatus 200 are included in the communication system 1, and data communication is carried out via the living body 20 between the communication apparatus 100 and the communication apparatus 200. The communication apparatus 100 is provided with the substrate 103, the communication unit 104, the signal line 105, the terminal 106, the signal line 107, the signal electrode 108, the conductive material 109, the housing 110, and the via 111. The conductive material 109 is arranged on the three faces on the outer side of the housing 110. The conductive material 109 disposed on the top surface on the outer side of the housing 110 is arranged so as to be opposite to the signal electrode 108 arranged on the inner side of the housing 110, and is arranged on the housing 110 so as to have the outer peripheral portion extended outward by the length L beyond the outer periphery of the signal electrode 108.

Accordingly, the conductive material 109 having no physical connection to the substrate 103 is arranged on the outer side of the housing 110 to thus enable a significant improvement in the receiver sensitivity of the communication apparatus 100. Also, the waterproofness of the communication apparatus 100 and the strength of the housing 110 can be improved. Therefore, the transmitting/receiving performance of the communication system 1 can be significantly improved. Also, arrangement of the conductive material 109 on plural faces on the outer side of the housing 110 enables maintaining the receiver sensitivity regardless of how the communication apparatus 100 is held in the hands or how the communication apparatus 100 is oriented in a pocket in clothes or the like.

Figure 10:
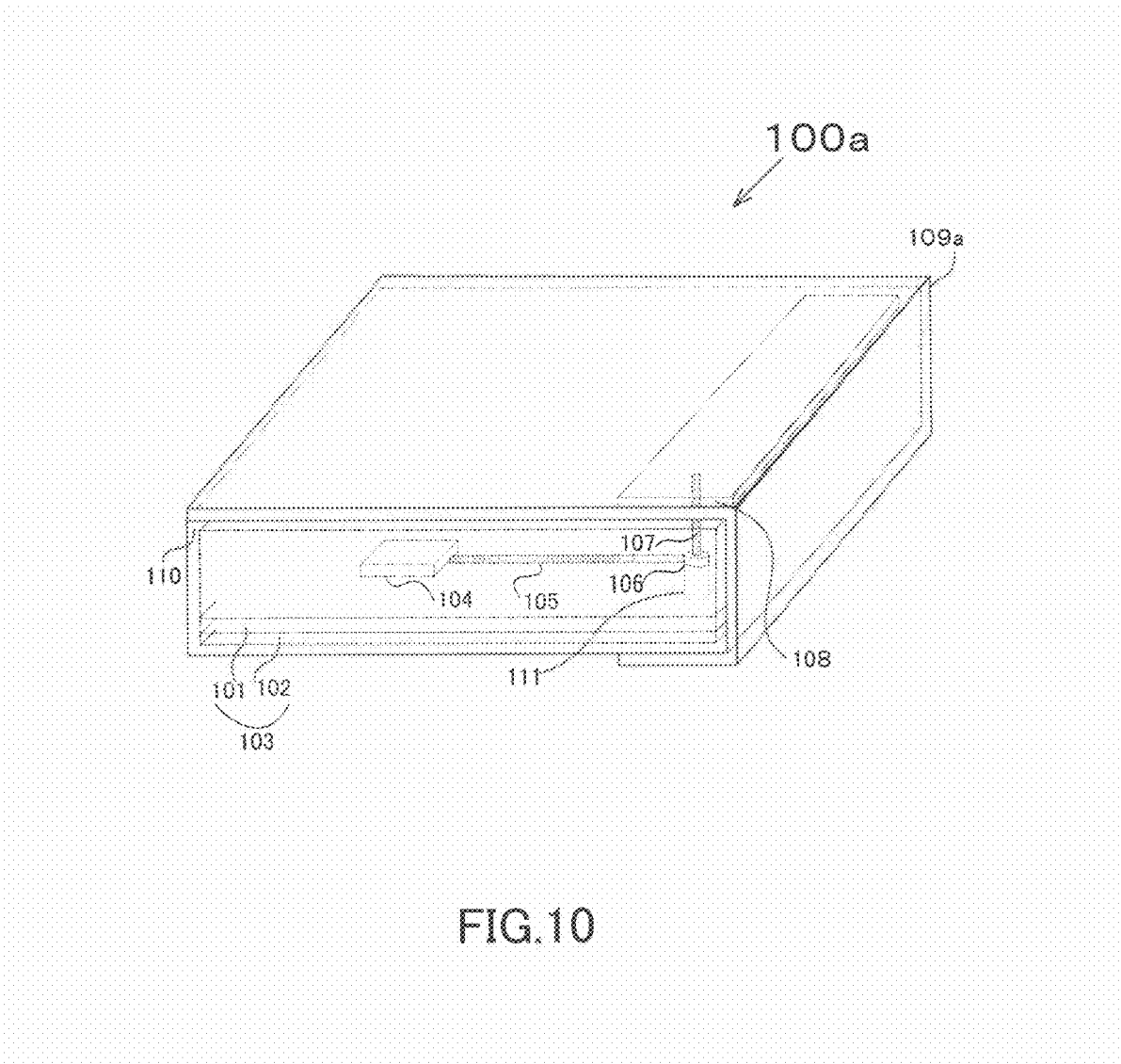
FIG. 10 is a view showing a configuration of a communication apparatus of a first modification.

Incidentally, although in the embodiment the conductive material 109 is arranged on the outer side of the housing 110 so as to be opposite to the signal electrode 108 with the housing 110 in between and is disposed so as to extend outward by the length L beyond the outer periphery of the signal electrode 108, the embodiment is not necessarily so limited. A conductive material 109a may be arranged as a communication apparatus 100a of a first modification shown in FIG. 10, for example. Specifically, the conductive material 109a may be arranged so as to cover one face, on which the signal electrode 108 is disposed in contact with the face, on the outer side of the housing 110.

Figure 11:
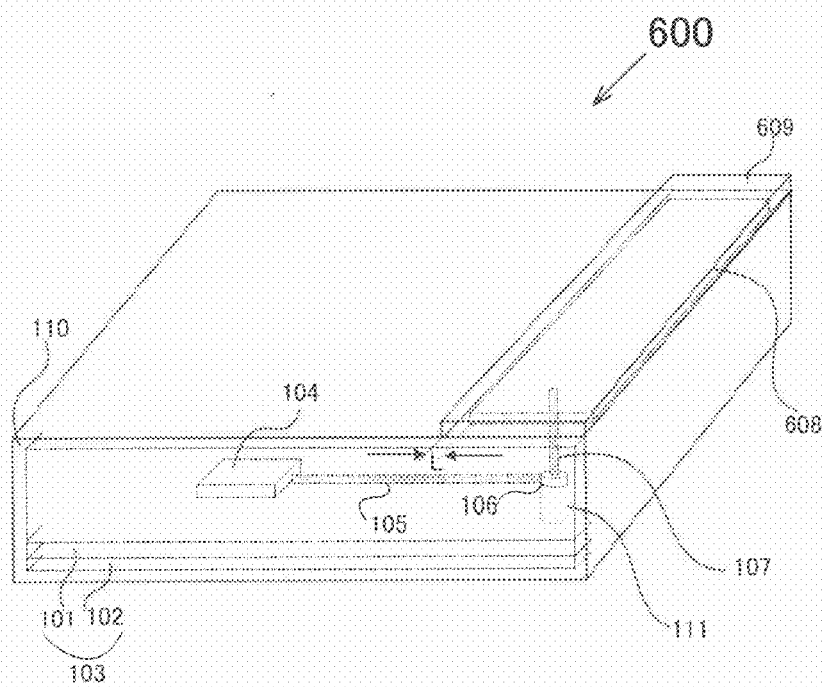
FIG. 11 is a view showing a configuration of a communication apparatus according to a second embodiment.

A communication apparatus according to a second embodiment will be described with reference to the drawing. FIG. 11 is a view showing a configuration of the communication apparatus. In the embodiment, a conductive material is arranged only on one face, with which a signal electrode is in contact, on the outer side of the housing.

Hereinafter, the same constituent portions as those of the first embodiment are indicated by the same reference numerals and description of the portions will be omitted, and different portions alone will be described.

As shown in FIG. 11, a communication apparatus 600 is provided with a substrate 103, a communication unit 104, a signal line 105, a terminal 106, a signal line 107, a signal electrode 608, a conductive material 609, a housing 110, and a via 111. In the communication apparatus 600, capacitive coupling occurs between the living body 20 and the conductive material 609 and between the conductive material 609 and the signal electrode 608 to, consequently, produce an electric field on the surface of the living body 20 and thereby effect data communication.

The signal electrode 608 connected to the other end of the signal line 107 is disposed on the signal line 107. The signal electrode 608 has a quadrangular shape (as seen from right above in FIG. 11). Here, the signal line 107 and the signal electrode 608 are arranged in a direction perpendicular to the substrate 103.

The housing 110 has the shape of a quadratic prism in which a horizontal dimension is larger than a height dimension. The housing 110 covers and accommodates therein the substrate 103, the communication unit 104, the signal line 105, the terminal 106, the signal line 107, the via 111, and the signal electrode 608.

The conductive material 609 is arranged on a top surface on the outer side of the housing 110. The conductive material 609 is arranged so as to be opposite to the signal electrode 608 arranged on the inner side of the housing 110, and is arranged on the outer side of the housing 110 so as to have an outer peripheral portion extended outward by a length L beyond an outer periphery of the signal electrode 608.

Here, an electrically-conductive metal sheet such as a copper foil, an electrically-conductive ink formed into a thin film and sintered by using coating or ink-jet method, or a transparent electrode film such as ITO (indium tin oxide), for example, or the like is used for the conductive material 609.

As described above, according to the communication apparatus of the embodiment, the communication apparatus 600 is provided with the substrate 103, the communication unit 104, the signal line 105, the terminal 106, the signal line 107, the signal electrode 608, the conductive material 609, the housing 110, and the via 111. The conductive material 609 is arranged on the top surface on the outer side of the housing 110. The conductive material 609 is arranged so as to be opposite to the signal electrode 608 arranged on the inner side of the housing 110, and is arranged on the outer side of the housing 110 so as to have the outer peripheral portion extended outward by the length L beyond the outer periphery of the signal electrode 608.

Accordingly, besides the advantageous effects of the first embodiment, suppression of an increase in noise level produced when the conductive material 609 receives external interference waves can be achieved as compared to the first embodiment.

Figure 12A:
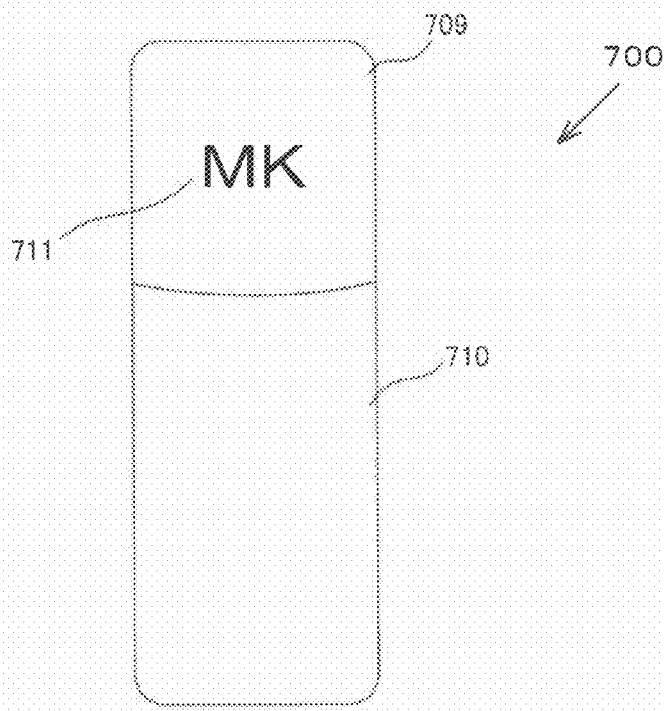
FIGS. 12(a) and 12(b) are a plan view and a cross-sectional view, respectively, showing a communication apparatus according to a third embodiment.
Figure 12B:
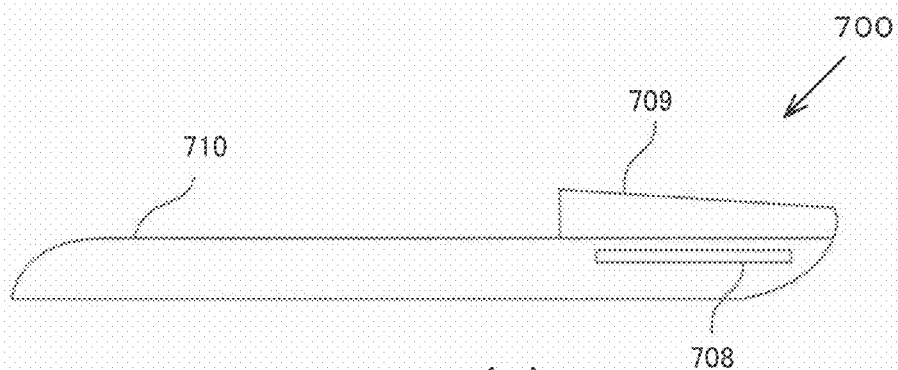

A communication apparatus according to a third embodiment will be described with reference to the drawings. FIGS. 12(a) and 12(b) are a plan view and a cross-sectional view, respectively, showing the communication apparatus. In the embodiment, a conductive material is provided on a top surface with a mark.

As shown in FIG. 12(a), a communication apparatus 700 is provided with a conductive material 709, a housing 710, and a mark 711. The housing 710 has a round shape at corners, and has a rectangular shape in which a length is longer than a width. The conductive material 709 is disposed so as to cover an upper portion of the housing 710, and has the mark 711 (represented as MK in FIG. 12(a)) arranged on a top surface in a central portion. The mark 711 is used as the mark indicating a contact portion for communication. The communication apparatus 700 carries out data communication via the living body 20.

As shown in FIG. 12(b), the housing 710 has a round shape in a right side surface portion and a left side surface portion, and a signal electrode 708 is arranged on the inner side of the housing 710. The conductive material 709 is arranged on the outer side of the housing 710 so as to be opposite to the signal electrode 708, and is arranged with the housing 710 in between so as to have an outer peripheral portion extended outward beyond an outer periphery of the signal electrode 708. The conductive material 709 becomes thicker from an end portion of the housing 710 toward a central portion of the housing 710.

Incidentally, although not shown in the drawing, a reference potential electrode as a reference potential of the communication apparatus 700 and a substrate as a dielectric layer are contained in the housing 710. A communication unit, a signal line that provides a connection between the communication unit and the signal electrode 708, and the like are arranged on the substrate.

As described above, according to the communication apparatus of the embodiment, the communication apparatus 700 is provided with the conductive material 709, the housing 710, and the mark 711. The mark 711 is arranged on the top surface in the central portion of the conductive material 709. The end portions of the housing 710 have the round shape.

Accordingly, when using the communication apparatus 700 as carried in a pocket in clothes or the like, a user can carry the communication apparatus 700 intentionally with the conductive material 709 oriented to the surface of the living body 20. Also, the end portions of the housing 710 have the round shape and the conductive material 709 becomes thicker from the end portion of the housing 710 toward the central portion of the housing 710, and thus, the conductive material 709 faces the surface of the living body 20 in parallel, so that components of an electric field produced by capacitive coupling between the conductive material 709 and the surface of the living body 20 are perpendicular to the surface of the living body 20. Therefore, communication performance of the communication apparatus 700 can be improved.

Figure 13A:
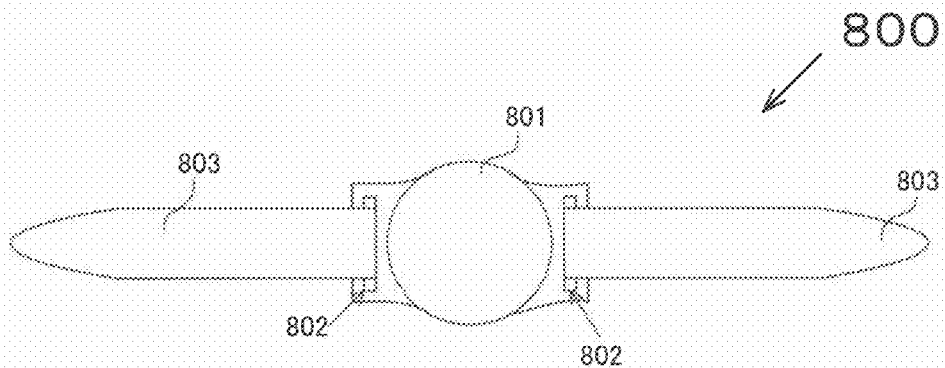
FIGS. 13(a) and 13(b) are a plan view and a cross-sectional view, respectively, showing a communication apparatus according to a fourth embodiment.
Figure 13B:
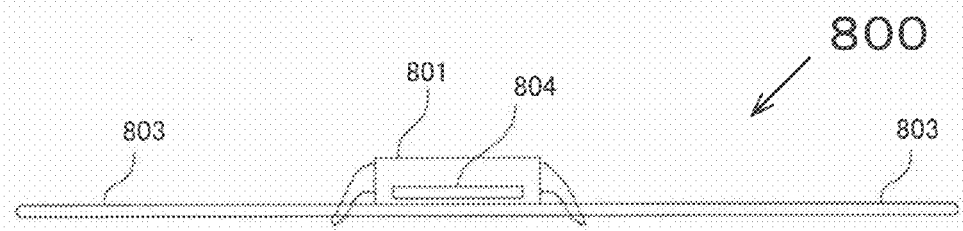

A communication apparatus according to a fourth embodiment will be described with reference to the drawings. FIGS. 13(a) and 13(b) are a plan view and a cross-sectional view, respectively, showing the communication apparatus. In the embodiment, an electrically-conductive belt is provided in place of the conductive material.

As shown in FIG. 13(a), a communication apparatus 800 is provided with a housing 801 and an electrically-conductive belt 803. The housing 801 has a circular shape in a central portion, and is provided in end portions with slits 802. The electrically-conductive belt 803 has a round shape in end portions and has a belt-like shape. The electrically-conductive belt 803 is inserted into the slits 802 of the housing 801.

As shown in FIG. 13(b), the housing 801 is arranged in contact with the electrically-conductive belt 803, and is arranged so that a signal electrode 804 disposed in the housing 801 is opposite to the electrically-conductive belt 803.

The electrically-conductive belt 803 is fixed by being wound around the user's arm, leg or trunk or the like. An electrically-conductive metal sheet such as a copper foil press-bonded on a top surface, an electrically-conductive ink formed into a thin film and sintered by using coating or ink-jet method, or electrically-conductive fiber, or the like is used for the electrically-conductive belt 803. Here, although the slits 802 are provided in two locations, the embodiment is not necessarily so limited. For example, the slits 802 may be provided in three or more locations. When the slits 802 are provided in three or more locations, the electrically-conductive belt 803 can be fixed by being inserted into any two locations according to which part of the body the electrically-conductive belt 803 is attached to.

Incidentally, although not shown in the drawing, a reference potential electrode as a reference potential of the communication apparatus 800 and a substrate as a dielectric layer are contained in the housing 801. A communication unit, a signal line that provides a connection between the communication unit and the signal electrode 804, and the like are arranged on the substrate.

As described above, according to the communication apparatus of the embodiment, the communication apparatus 800 is provided with the housing 801 and the electrically-conductive belt 803. The housing 801 is provided at the ends with the slits 802. The electrically-conductive belt 803 has the round shape in the end portions and has the belt-like shape, and the electrically-conductive belt 803 is inserted into the slits 802 of the housing 801 thereby to fix the communication apparatus 800 to the body.

Accordingly, the electrically-conductive belt 803 can be arranged at a position opposite to the signal electrode 804 to thus facilitate fixing the communication apparatus 800 to the user's body. Also, an electric field produced by capacitive coupling between the surface of the living body 20 and the electrically-conductive belt 803 is always perpendicular to the surface of the living body 20, not depending on user's posture or movement. Therefore, there is no variation in intensity of radio waves propagating along the surface of the living body 20, and thus, the communication apparatus 800 can achieve stable communication performance.

Figure 14A:
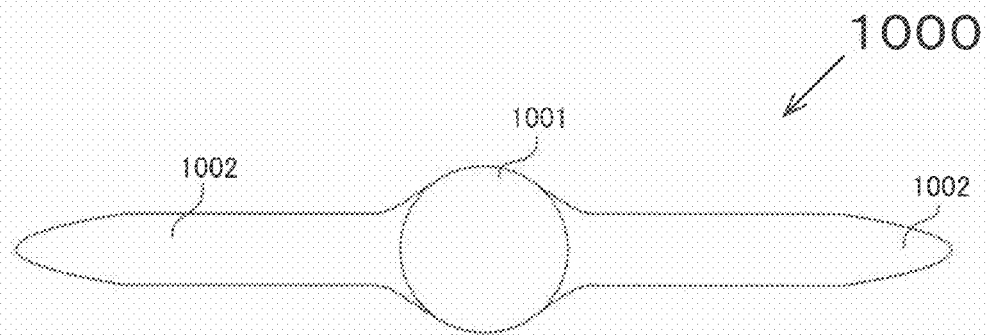
FIGS. 14(a) and 14(b) are a plan view and a cross-sectional view, respectively, showing a communication apparatus of a second modification.
Figure 14B:
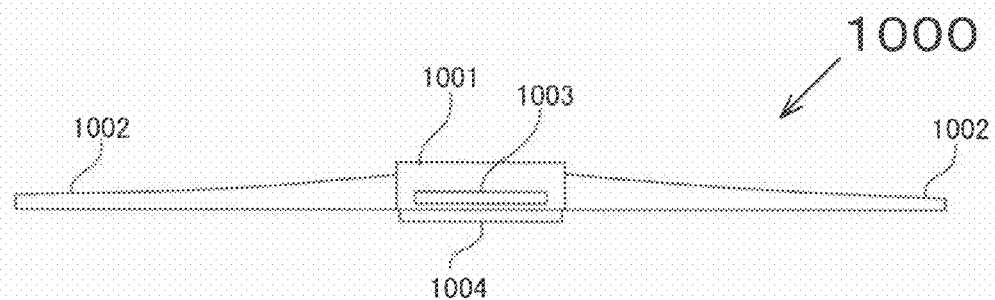

Incidentally, although in the embodiment the electrically-conductive belt 803 is disposed so as to be in contact with the housing 801, the embodiment is not necessarily so limited. A conductive material 1004 and an electrically-conductive belt 1002 may be arranged as a communication apparatus 1000 of a second modification shown in FIGS. 14(a) and 14(b), for example. Specifically, the conductive material 1004 is arranged so as to be opposite to a signal electrode 1003 with a housing 1001 in between, and the electrically-conductive belt 1002 is arranged on lateral sides of end portions of the housing 1001.

Figure 15:
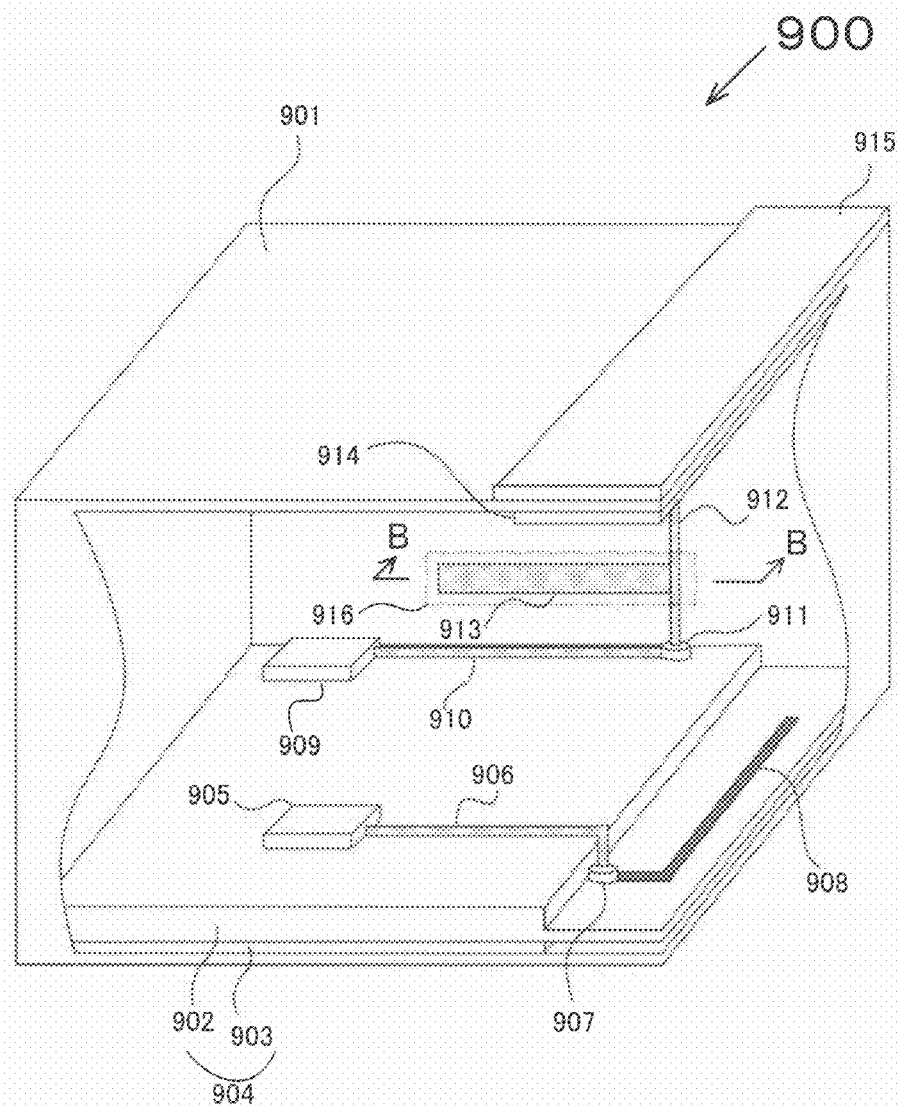
FIG. 15 is a view showing a configuration of a communication apparatus according to a fifth embodiment.
Figure 16:
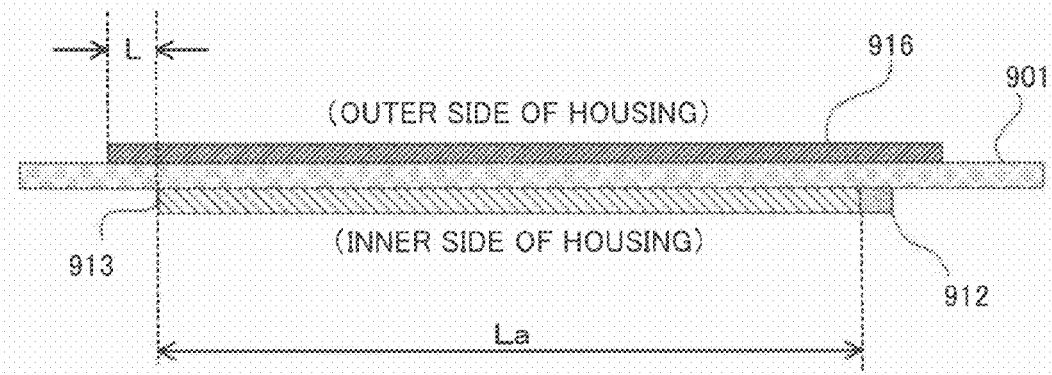
FIG. 16 is a cross-sectional view of the communication apparatus taken along line B-B of FIG. 15.

A communication apparatus according to a fifth embodiment will be described with reference to the drawings. FIG. 15 is a view showing a configuration of the communication apparatus. FIG. 16 is a cross-sectional view of the communication apparatus taken along line B-B of FIG. 15. In the embodiment, a first communication unit that carries out communication via an antenna and a second communication unit that carries out communication via a living body are provided.

As shown in FIG. 15, a communication apparatus 900 is provided with a substrate 904, a communication unit 905, a communication unit 909, a signal line 906, a signal line 910, a signal line 912, a terminal 907, a terminal 911, a signal electrode 914, a conductive material 915, a conductive material 916, an electrode 913, an antenna 908, and a housing 901.

On the communication unit 909 side of the communication apparatus 900, capacitive coupling occurs between the living body 20 and the conductive material 915 and between the conductive material 915 and the signal electrode 914 to, consequently, produce an electric field on the surface of the living body 20 and thereby effect data communication. Incidentally, capacitive coupling likewise occurs between the living body 20 and the conductive material 916 and between the conductive material 916 and the electrode 913 to produce an electric field on the surface of the living body 20. Data communication with external equipment via the antenna 908 takes place on the communication unit 905 side of the communication apparatus 900. Carrier frequencies for use in the communication unit 905 and the communication unit 909 are different.

The substrate 904 includes a dielectric portion 902 and a reference potential electrode 903. The dielectric portion 902 is disposed on a first principal surface (a top surface) of the reference potential electrode 903. Here, the dielectric portion 902 is reduced in thickness in a portion where the terminal 907 and the antenna 908 are arranged. Also, the reference potential electrode 903 is disposed so as to avoid the reduced-thickness portion of the dielectric portion 902. The dielectric portion 902 is constructed of insulating ceramics or insulating organic matter, for example, or the like. The reference potential electrode 903 is constructed of a metal layer such as copper (Cu) or gold (Au), for example. An electrically-conductive metal sheet such as a copper foil, an electrically-conductive ink formed into a thin film and sintered by using coating or ink-jet method, or a transparent electrode film such as ITO, for example, or the like is used for the conductive material 915 and the conductive material 916.

Here, the signal line 906 and the signal line 910 are each the same as the signal line 105 of the first embodiment, and the signal line 912 is the same as the signal line 107 of the first embodiment. Also, the terminal 907 and the terminal 911 each have the same internal configuration as the terminal of the first embodiment. Thus, description of the internal configurations of the signal line 906, the signal line 910, the signal line 912, the terminal 907, and the terminal 911 will be omitted.

The communication unit 905 (the first communication unit) is disposed on a first principal surface (a top surface) of the dielectric portion 902, and serves to transmit and receive data. The signal line 906 is disposed on the first principal surface (the top surface) of the dielectric portion 902 and is connected at one end to the communication unit 905. The terminal 907 is disposed on the first principal surface (the top surface) of the reduced-thickness portion of the dielectric portion 902 and is connected at one end to the other end of the signal line 906 and at the other end to the antenna 908. A ground portion of the communication unit 905, although not shown, is connected through a via to the reference potential electrode 903.

The communication unit 909 (the second communication unit) is disposed on the first principal surface (the top surface) of the dielectric portion 902 and is spaced away from the communication unit 905 (the first communication unit), and serves to transmit and receive data via the living body 20. A ground portion of the communication unit 909, although not shown, is connected through the via to the reference potential electrode 903. The signal line 910 is disposed on the first principal surface (the top surface) of the dielectric portion 902 and is connected at one end to the communication unit 909. The terminal 911 is disposed on the first principal surface (the top surface) of the dielectric portion 902 and is connected at one end to the other end of the signal line 910 and at the other end to one end of the signal line 912. The signal line 912 is connected at the other end to the signal electrode 914. The electrode 913 has a rectangular shape that is long in a lateral direction, and is connected at one end directly to an inner signal line of the signal line 912. Incidentally, a dielectric layer that forms the signal line 912 is removed in a portion of connection of the electrode 913 and the signal line 912.

The housing 901 has the shape of a quadratic prism that is long in a horizontal direction, and covers and accommodates therein the substrate 904, the communication unit 905, the communication unit 909, the signal line 906, the signal line 910, the signal line 912, the terminal 907, the terminal 911, the signal electrode 914, the electrode 913, and the antenna 908. The signal line 912 and the electrode 913 are arranged on an inner surface at the back of the housing 901. The signal electrode 914 is arranged on an inner surface on an upper right side of the housing 901.

The conductive material 915 is arranged on an upper right surface on the outer side of the housing 901. The conductive material 915 is arranged so as to be opposite to the signal electrode 914 arranged on the inner side of the housing 901, and is arranged on the outer side of the housing 901 so as to have an outer peripheral portion extended outward beyond an outer periphery of the signal electrode 914.

As shown in FIG. 16, the electrode 913 has a length La in a lateral direction, and is arranged on the inner side of the housing 901 so as to be opposite to the conductive material 916. The conductive material 916 is arranged on the outer side of the housing 901 so as to have an outer peripheral portion extended outward by a length L beyond an outer periphery of the electrode 913. During data communication, the conductive material 915 and the conductive material 916 are in contact with the living body 20.

Here, the length La of the electrode 913 is adjusted to a length equal to one-quarter wavelength of a communication frequency of the antenna 908, and the antenna 908 functions as a choke element at the communication frequency at which the antenna 908 operates.

As described above, according to the communication apparatus of the embodiment, the communication apparatus 900 is provided with the substrate 904, the communication unit 905, the communication unit 909, the signal line 906, the signal line 910, the signal line 912, the terminal 907, the terminal 911, the signal electrode 914, the conductive material 915, the conductive material 916, the electrode 913, the antenna 908, and the housing 901. The electrode 913 has the rectangular shape that is long in the lateral direction, and is connected at one end to the signal line 912. The length La of the electrode 913 is adjusted to the length equal to one-quarter wavelength of the communication frequency of the antenna 908, and the antenna 908 functions as the choke element at the communication frequency at which the antenna 908 operates.

Accordingly, a current leaking from the terminal 907 connected to the antenna 908 can be prevented from propagating along the substrate 904 into the signal line 912. Therefore, the antenna 908 can ensure constant performance regardless of where the signal electrode 914 is arranged. Also, an arrangement of the signal electrode 914, the electrode 913, the conductive material 915 and the conductive material 916 enables improving the waterproofness of communication equipment and ensuring the strength of the housing 901, thus enabling an improvement in the receiver sensitivity and hence diversity reception.

While certain embodiments have been described, these embodiments have been presented by way of example only, and are not intend to limit the scope of the inventions. Indeed, the novel embodiments described herein may be embodied in a variety of the other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus, comprising:
    a substrate provided with a reference potential electrode;
    a communication unit provided on a first principal surface of the substrate;
    a first signal line provided on the first principal surface of the substrate and connected at one end to the communication unit;
    a terminal provided on the first principal surface of the substrate and connected at one end to the other end of the first signal line;
    a second signal line provided on the first principal surface side of the substrate and connected to the first signal line through the terminal, the second signal line having one end connected to the other end of the terminal;
    a signal electrode provided on the first principal surface side of the substrate and connected to the other end of the second signal line;
    a housing configured to cover and accommodate therein the substrate, the communication unit, the first signal line, the terminal, the second signal line, and the signal electrode; and a conductive material arranged on an outer side of the housing so as to be opposite to the signal electrode, and including an outer peripheral portion extended outward beyond an outer periphery of the signal electrode, wherein the communication apparatus carries out data communication via a living body.

2. The communication apparatus according to claim 1, wherein capacitive coupling occurs between the living body and the conductive material and between the conductive material and the signal electrode thereby to effect the data communication.

3. The communication apparatus according to claim 1, wherein the terminal includes an inner conductive portion and an outer conductive portion, the second signal line includes an inner signal line and a dielectric layer, one end of the inner conductive portion is connected to the other end of the first signal line, the other end of the inner conductive portion is connected to one end of the inner signal line, the other end of the inner signal line is connected to the signal electrode, and one end of the outer conductive portion is connected through a via to the reference potential electrode.

4. The communication apparatus according to claim 1, wherein the signal electrode is arranged on one side surface of an inner side of the housing, and the conductive material is arranged on at least one side surface of an outer side of the housing.

5. The communication apparatus according to claim 1, wherein the conductive material is provided on one end side of the housing, becomes thicker from an outer peripheral side of the housing toward a center side of the housing, and is provided with a mark on a top surface of the conductive material, and one end portion of the housing has an arcuate shape.

6. The communication apparatus according to claim 5, wherein the mark indicates a contact portion for communication.

7. The communication apparatus according to claim 1, wherein end portions of the housing are provided with slits, and the conductive material has a belt shape inserted into the slits and extending along one side surface of the housing and on both sides of the housing.

8. The communication apparatus according to claim 1, wherein the conductive material is provided on a bottom surface side of the housing, and an electrically-conductive belt having a belt shape extending on both sides of the housing is provided.

9. The communication apparatus according to claim 1, wherein the conductive material is any one of an electrically-conductive metal sheet, an electrically-conductive ink, and a transparent electrode film.

10. The communication apparatus according to claim 1, wherein the signal electrode has a top surface in a quadrangular shape.

11. The communication apparatus according to claim 1, wherein during the data communication, the conductive material is in contact with the living body.

12. A communication apparatus, comprising:

a substrate provided with a reference potential electrode;

a first communication unit provided on a first principal surface of the substrate;

a first signal line provided on the first principal surface of the substrate and connected at one end to the first communication unit;

a first terminal provided on the first principal surface of the substrate and connected at one end to the other end of the first signal line;

an antenna provided on the first principal surface side of the substrate and connected to the first signal line through the first terminal, the antenna having one end connected to the other end of the first terminal;

a second communication unit provided on the first principal surface of the substrate;

a second signal line provided on the first principal surface of the substrate and connected at one end to the second communication unit;

a second terminal provided on the first principal surface of the substrate and connected at one end to the other end of the second signal line;

a third signal line provided on the first principal surface side of the substrate and connected to the second signal line through the second terminal, the third signal line having one end connected to the other end of the second terminal;

a signal electrode provided on the first principal surface side of the substrate and connected to the other end of the third signal line;

a first conductive material connected to the third signal line, and having a length equal to one-quarter wavelength of a communication frequency of the antenna;

a housing configured to cover and accommodate therein the first communication unit, the first signal line, the first terminal, the antenna, the second communication unit, the second signal line, the second terminal, the third signal line, the signal electrode, and the first conductive material;

a second conductive material arranged on an outer side of the housing so as to be opposite to the signal electrode, and including an outer peripheral portion extended outward beyond an outer periphery of the signal electrode; and a third conductive material arranged on the outer side of the housing so as to be opposite to the first conductive material, and including an outer peripheral portion extended outward beyond an outer periphery of the first conductive material, wherein the second communication unit carries out data communication via a living body.

13. The communication apparatus according to claim 12, wherein the antenna functions as a choke element.

14. The communication apparatus according to claim 12, wherein the substrate includes a stacked structure of a dielectric portion and the reference potential electrode, and the dielectric portion is thinner in a portion where the first terminal and the antenna are provided, than in the rest of the dielectric portion.

15. The communication apparatus according to claim 14, wherein the reference potential electrode is not provided right under the first terminal and the antenna.

16. The communication apparatus according to claim 12, wherein
   the second conductive material and the third conductive material are each any one of an electrically-conductive metal sheet, an electrically-conductive ink, and a transparent electrode film.

17. The communication apparatus according to claim 12, wherein
   the signal electrode has a top surface in a rectangular shape.

18. The communication apparatus according to claim 12, wherein
   during the data communication, the second conductive material and the third conductive material are in contact with the living body.

* * * * *